72085
P. Atkinson Ross's Imp! in Shovel Plows Cultivators etc.
PATENTED
DEC 10 1867
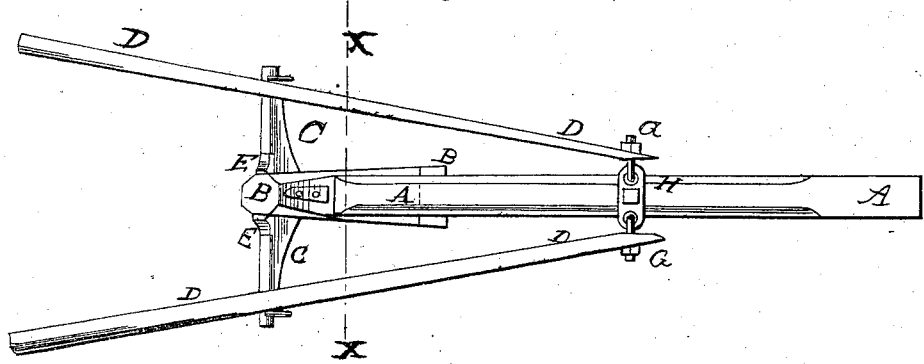
Fig: 1.
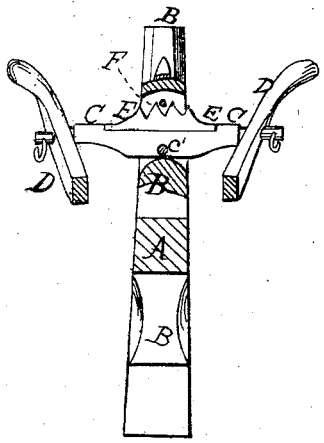
Fig: 3.
Witnesses.
Theo Tusher
Wm Frewn
Inventor:
P A Ross
Per Munn & Co
Attorneys

United States Patent Office.

P. ATKINSON ROSS, OF HARVEYS, PENNSYLVANIA.

Letters Patent No. 72,085, dated December 10, 1867.

IMPROVEMENT IN SHOVEL-PLOUGHS, CULTIVATORS, &c.

The Schedule referred to in these Letters Patent and making part of the same.

TO ALL WHOM IT MAY CONCERN:

Be it known that I, P. ATKINSON ROSS, of Harveys, in the county of Greene, and State of Pennsylvania, have invented a new and useful Improvement in Shovel-Ploughs, Cultivators, &c.; and I do hereby declare that the following is a full, clear, and exact description thereof, which will enable those skilled in the art to make and use the same, reference being had to the accompanying drawings, forming part of this specification, in which—

Figure 1 is a top view of a single-shovel plough, illustrating my invention.

Figure 2 is a detail cross-section of the same, taken through the line $x\,x$, fig. 1.

Similar letters of reference indicate corresponding parts.

My invention has for its object to improve the construction of single and double-shovel ploughs, cultivators, &c., so as to enable them to be readily adjusted for use upon side-hills or level ground, so that the handles may be secured in nearly a level position, while the plough is held in the best position for doing its work properly; and it consists in the manner in which the cross-bar is adjustably secured to the standard, and in the manner in which the forward ends of the handles are connected to the beam; the whole being constructed and arranged as hereinafter more fully described.

A is the beam of the plough, to the rear end of which the standard B is rigidly and securely attached. C is the cross-bar, which passes through a slot in the standard B, and to the ends of which the handles D are attached. The slot through the standard B is made so large that the cross-bar C may rock in it, and the said cross-bar is secured and pivoted in place by the pin $c'$, that passes through the standard B, and through the cross-bar C, below its central point, as shown in fig. 2. To the upper side of the cross-bar C, at its central part, is attached a rack, E, having three, or some other odd number of notches formed in it, as shown in fig. 2, so that the said cross-bar may be secured in a horizontal or inclined position, according as it is desired to have the plough work upon level ground or upon a side-hill. The cross-bar C is secured in place when adjusted, by a pin, F, passing through the standard B, and through one or the other of the notches of the rack E. Upon the ends of the cross-bar C are formed round tenons, which pass through holes in the handles D, so that the said handles may have a slight movement upon the said cross-bar. To the forward ends of the handles D are attached hooks or eye-bolts, G, by which the forward ends of the said handles are pivoted to the ends of the bar or plate H, which is pivoted at its centre to the beam A, as shown in fig. 1, so that the said handles may readily adjust themselves, according to the position of the cross-bar C.

I claim as new, and desire to secure by Letters Patent—

1. The combination of the notched rack E and removable pin F, with the pivoted or rocking cross-bar C and slotted standard B, substantially as herein shown and described, and for the purpose set forth.

2. Connecting the forward ends of the handles D to the beam A, by means of the hook or eye-bolts G and pivoted bar or plate H, when used in connection with the pivoted or rocking cross-bar C and pin F, substantially as herein shown and described, and for the purpose set forth.

P. ATKINSON ROSS.

Witnesses:
 JOHN ROGERS,
 JAMES M. MOORE.